United States Patent [19]
Prestridge

[11] 4,120,769
[45] Oct. 17, 1978

[54] PROCESS FOR MIXING AND SEPARATION IN A SOLVENT EXTRACTION SYSTEM

[75] Inventor: Floyd Leon Prestridge, Tulsa, Okla.

[73] Assignee: Combustion Engineering, Inc., Windsor, Conn.

[21] Appl. No.: 819,320

[22] Filed: Jul. 27, 1977

[51] Int. Cl.² .......................... C25C 1/12; B03C 5/00; C22B 3/00; C22B 15/00
[52] U.S. Cl. ............................... 204/186; 75/101 BE; 75/117; 204/108
[58] Field of Search ............... 204/186, 189, 190, 106, 204/108; 75/101 BE, 117

[56] References Cited

U.S. PATENT DOCUMENTS

| | | | |
|---|---|---|---|
| 3,200,059 | 8/1965 | Mills | 204/186 |
| 3,437,575 | 4/1969 | Gross et al. | 204/186 |
| 3,582,491 | 6/1971 | Louvar et al. | 204/186 |
| 3,673,070 | 6/1972 | Wiley | 204/186 |
| 4,039,404 | 8/1977 | Richards et al. | 204/108 |

FOREIGN PATENT DOCUMENTS

| | | | |
|---|---|---|---|
| 695,799 | 10/1964 | Canada | 204/186 |
| 1,224,950 | 3/1971 | United Kingdom | 204/186 |

*Primary Examiner*—T. M. Tufariello
*Attorney, Agent, or Firm*—Arthur L. Wade

[57] ABSTRACT

An ion exchange compound in a fluid organic carrier is cycled between mixing and separating from a weak acid stream and a strong acid stream. The weak acid stream is cycled between directly contacting ore to chemically dissolve metal and exchanging the metal for hydrogen ions of the exchange compound. The strong acid stream is cycled between exchanging its hydrogen ions for the metal bonded to the exchange compound and yielding the metal to a recovery system. The mixing and separation of the organic carrier with the two acid streams is by a pump, an electric field and a centrifuge.

4 Claims, 2 Drawing Figures

PROCESS FOR MIXING AND SEPARATION IN A SOLVENT EXTRACTION SYSTEM

BACKGROUND OF THE INVENTION

Hydro-metallurgical mining has been developed over the past twenty years with large scale application. The first success was in recovery of uranium and other rare elements under work by the Atomic Energy Commission.

General Mills Chemicals, Inc., Minneapolis, Minnesota has developed a series of ion exchange reagents for particular metals and marketed the compounds under the trademark LIX. These developments raise the expectations of developing a chemical extractant for any metal.

One of the more visible of the commercially successful LIX organic liquids has been that used in the mining of copper. A relatively weak acid has comprised an extractor loop which chemically dissolves copper from a dump, or sump, of ore. The LIX ion exchange compound, carried in an organic solvent such as kerosene, is mixed with the copper-pregnant acid. The hydrogen ion of the compound exchanges for the copper of the acid. After separation from its copper, the weak acid is returned to the ore of the dump. The ion exchange compound, loaded with the copper, is mixed with an acid strong enough for its hydrogen ions to push the copper from the loaded ion exchange compound and regenerate the compound with the hydrogen ions. From another viewpoint, the ion exchange compound in its reaction with the acid streams, shifts its equilibrium in accordance with the amount of hydrogen ions available from the acid streams.

The present problem of mixing and separation is not limited to the ion exchange systems. In any system where two immiscible fluids require thorough mixing for a physical or chemical exchange between the fluids there follows the problem of separation of the fluids. If two immiscible fluids exchange a third fluid between them, dependent upon the solubility of the third fluid in the first two fluids, there is a mixing and separation problem to be solved.

However, for disclosing the present invention, the embodiment will relate to an ion exchange system which may also be termed a solvent extraction system. The terminology of the disclosure may become fairly specific, but the problem solved is a common denominator of a broad range of liquid-liquid exchange systems.

STATEMENT OF THE INVENTION

The present invention is embodied in a process in which a material is exchanged between two fluid streams. The two streams are immiscible and intimately mixed to disperse the aqueous phase in the other fluid as the continuous phase. The resulting stable emulsion is passed through an electric field which coalesces the aqueous phase into enlarging drops. The separation is then completed by applying centrifugal force to the mixture to agglomerate the coalesced drops of the aqueous phase so it will gravitate from the continuous phase.

More specifically, the invention is embodied a pump in which the two immiscible fluids, as liquids, are thoroughly mixed to form a stable emulsion. The aqueous liquid is more polar than the liquid in which the aqueous liquid is finely dispersed. The emulsion is passed through the electric field established between two charged electrodes, and the more polar aqueous phase is coalesced into larger drops by the force of the field. The mixture is then passed into a centrifuge in the form of a hydraulic cyclone which generates a centrifugal force on the coalesced drops of the aqueous phase to agglomerate the drops on the inner wall of the cyclone into a layer which gravitates downward while the less dense continuous phase liquid is flowed upward in separation. It is to be understood that the more polar aqueous liquid phase may be coalesced by the force of the electric field but the continuous liquid phase may be the more dense and be moved to the wall of the centrifuge by the centrifugal force and the aqueous phase remain at the center of the centrifuge as the less dense of the liquids.

More specifically, the invention is also embodied in a liquid-liquid solvent extraction system in which an ion exchange material may be termed a reagent and carried in a liquid organic such as kerosene. The material may be more broadly classified as a ligand which is defined as a molecule, ion or group bound to a central atom in a chelate or a coordination compound.

Although the central atom of the ligand is not limited to a metal, it is almost exclusively one of the metals. In all events, whether the exchange material is termed an ion exchange material in a limited sense or a ligand in the more broad sense, it functions in the system in which the invention is embodied to selectively bond to material in a first liquid and yield the material to a second liquid. Whether it is narrowly, ion exchange material, or broadly, a ligand, the equilibrium to control the bonding to the selected metal depends upon the quantity of hydrogen ions available. These ions are supplied by the first liquid and the second liquid.

Even more specifically, the invention is embodied in a multi-stream solvent extraction system in which a first stream of barren leach raffinate is brought into direct contact with ore to chemically dissolve recoverable metal. A stream of a ligand in an organic carrier is mixed with the pregnant leach liquid with a pump until the selected metal is bonded to the ligand. An electric field is formed and the mixture flowed through the field to coalesce the leach raffinate. A centrifuge is connected to receive the mixture and complete the separation of the two liquids. The metal-loaded organic liquid is then mixed with barren strip liquid in a pump until the metal is transferred to the strip liquid. A second combination of electric field and centrifuge then coalesces the strip liquid and separates it from the organic liquid. The pregnant strip liquid is then passed to a recovery system for final recovery of the metal.

Other objects, advantages and features of the invention will become apparent to those skilled in the art as the description, appended claims and drawings are considered.

DESCRIPTION OF THE PREFERRED EMBODIMENT

Figure 1:
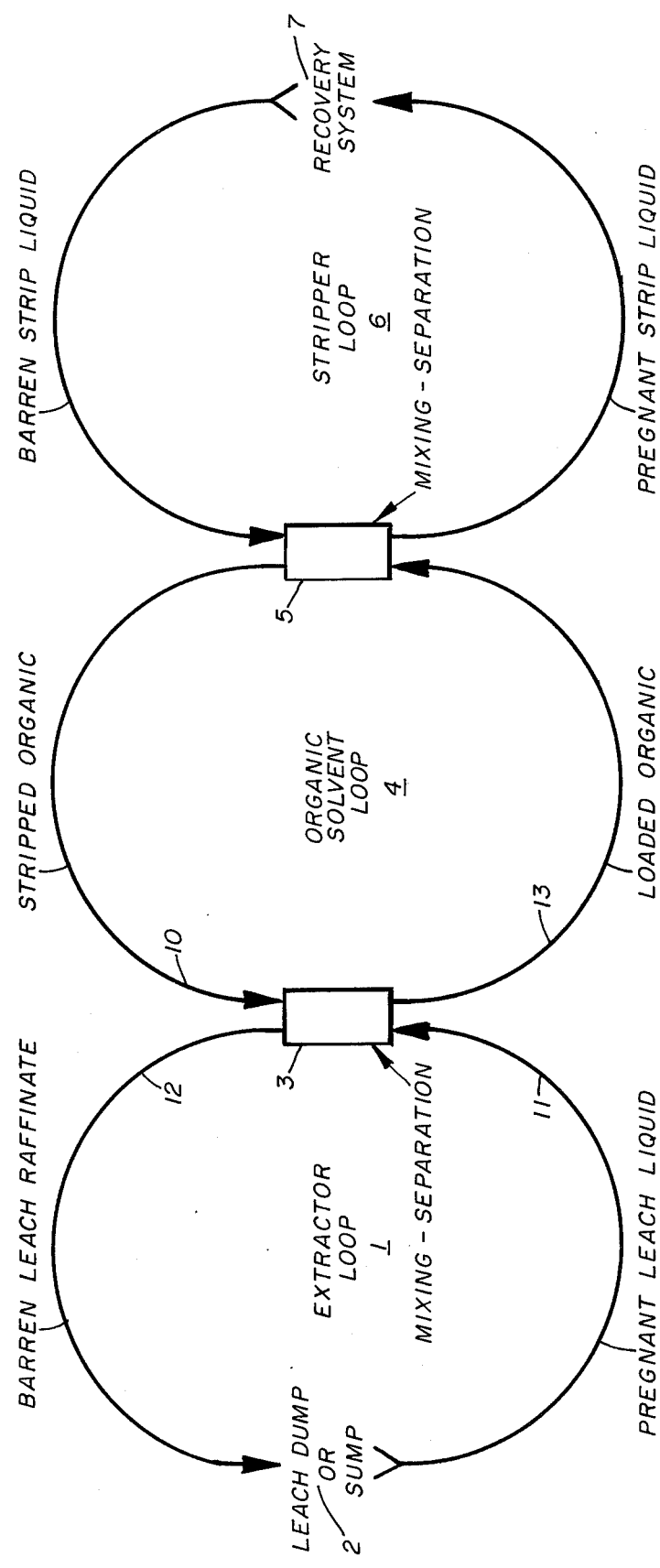
FIG. 1 is a schemmatic representation of the liquid streams of a solvent extraction system in which the present invention is embodied.

FIG. 1 discloses three interconnected loops which represent liquid streams of a solvent extraction system. The system will be disclosed as used to chemically dissolve metal from ore, concentrate the metal and transfer it to the stream which will transport the metal to a point of ultimate recovery. Used in this way, the system is described as solution mining.

The first liquid loop, or stream, 1 is termed the extractor. The liquid is brought into direct contact with ore 2 for dissolving metal from the ore. To complete the nomenclature, the loop 1 liquid will be called barren leach raffinate as it flows to the ore. As the liquid flows from the ore, with the metal dissolved, it will be called pregnant leach liquid.

The pregnant leach liquid is flowed to mixing-separation station 3 to be first mixed with the organic solvent as a carrier for an ion exchange compound, or ligand, as more broadly designated. However the exchange material of the loop, or stream, 4 is defined, it is thoroughly mixed with the pregnant leach liquid of loop 1. The amount of hydrogen ions available in the pregnant leach liquid is relatively low, at least low enough to shift the equilibrium conditions of the mixture so that the metal cation dissolved by the loop 1 liquids will be replaced by the hydrogen ion of the exchange material, or ligand. The design of the organic loop 4 liquids is carefully structured to select only the metal cation of loop 1 desired for recovery.

Not only is there a mixing problem at station 3 but there is a subsequent separation problem. After the mixing and the exchange, after the metal cation has been exchanged into the organic solvent, the resulting barren leach raffinate and metal-loaded organic must be clearly separated. The economic stakes are very high. If the required mixing for the exchange forms a stable emulsion, the cost of separation could be a large portion of the total cost of the system.

In general it is contemplated that the liquid of loop 1 will be an aqueous phase compared to the organic solvent loop 4 liquids. Further, it is contemplated that the aqueous loop 1 liquid will be significantly more polar than the loop 4 liquids. Therefore, if the mixing is done in a way to insure that the aqueous loop 1 liquids will be finely dispersed as drops in the organic loop 4 liquid as a continuous phase, electrical coalescense of the dispersed phase will be a great success with the present invention. Further, if the liquids are significantly different in density the present invention can complete the separation with centrifugal force in a time far less than the practice of the prior art.

The prior art has, for years, used huge mixing machines to slowly and cautiously blend the liquid streams together to avoid forming a stable emulsion. Then the mixture, after the exchange, has been carried to huge settling basins to enable the separation to take place. The size of the basins, and the time required for mixing and settling, results in vast inventories of these valuable liquids. The present invention drastically changes the situation. Mixing violently, a stable emulsion will be formed, but the electric field and centrifugal force provided by the invention greatly reduces the volumes of liquids required and the time needed for this separation.

Moving downstream in the system of FIG. 1, the loaded organic liquid of loop 4 is to exchange its metal cation for hydrogen ions of the third loop of liquids. Station 5 is similar to station 3 and mixed the loop 4 liquids with the liquids of stripper loop 6 for the exchange. Again, for nomenclature purposes, the barren strip liquid of loop 6 is flowed into station 5 and mixed with the loaded organic of loop 4. The exchange is made and the liquids are separated. The stripped organic of loop 4 flows out of station 5 and the pregnant strip liquid of loop 6 flows out of station 5 to recovery system 7. Therefore, the metal extracted by loop 1 is concentrated in loop 4 and stripped by loop 6 for ultimate recovery by system 7.

SOLVENT MINING OF COPPER

Without distorting, or narrowing, the concepts of the invention in mixing and separating the fluids of the loops 1, 4 and 6, the use of the system of FIG. 1 in the solvent mining of copper will be disclosed. The invention was conceived with this particular use contemplated. The invention was reduced to practice with a unit designed to recover copper. The copper mining industry has used the overall process for ten to twenty years and is now poised to make a technological breakthrough with the present invention.

The low grade ores of copper are advantageously leached with a dilute acid, usually sulphuric. This acid forms the stream 1, with relatively little hydrogen ions, which dissolve copper for transfer to the organic solvent of stream 4. The organic solvent is usually 90% kerosene, as the carrier liquid, and 5 to 10% ligand. The ligand presently satisfactory is selected from the LIX series manufactured by the General Mills Chemicals, Inc., Minneapolis, Minnesota. After the liquid-liquid transfer is made the acid, reformed with the hydrogen ions of the ligand, is separated from the organic with its load of metal.

The stream 4 is then mixed with stream 6. Stream 6, in the copper extraction process, is a strong acid with a relatively large content of hydrogen ions, which is designed to both extract the metal bonded to the ligand of stream 4 and yield the metal to an electrowinning recovery station.

Regardless of whether the mined material is specifically copper, uranium, or other metals, the solvent extraction system is generally organized with three loops of liquid streams through which the mined material passes. The first liquid loop can be acid or caustic. The ligand of the second organic stream selectively bonds to the material dissolved from ore and transfers the mined material to a third recovery stream.

MIXING-SEPARATION STATIONS 3 AND 5

Figure 2:
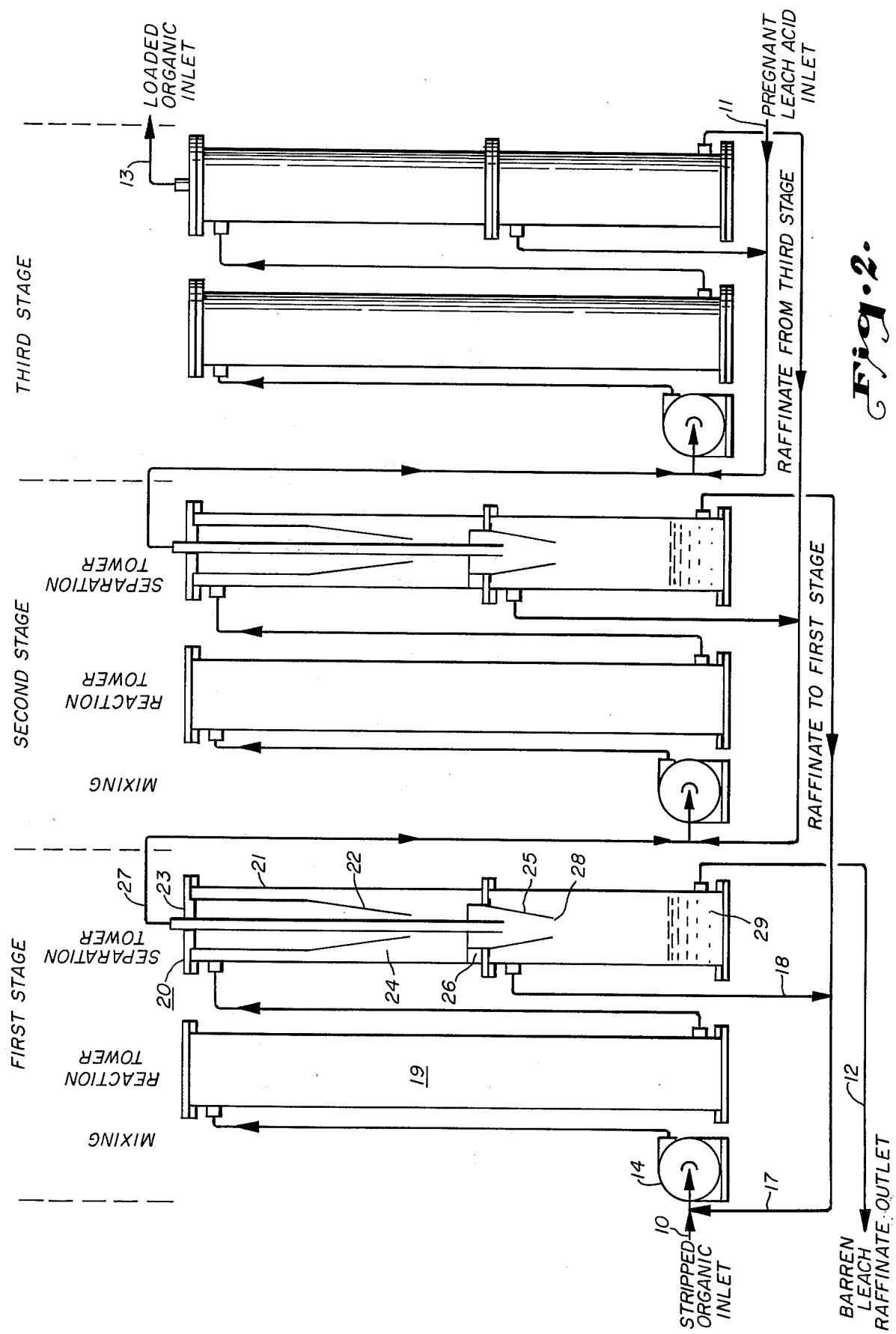
FIG. 2 is a somewhat schemmatic elevation of three stages of pumping, electric coalescer and centrifuge units with which metal exchange is made between the streams of the FIG. 1 system.

At this point, the mixing and separating structure at stations 3 and 5 are broken open with FIG. 2 to more fully disclose the invention. It would be very simple if the mixing and separation could be a one-time procedure. However, the equilibrium of a single stage of contact between the two liquids will hardly reach the level of completeness required of each station.

By the inherent nature of the chemical exchange, and equilibrium reached, more than one stage must be provided to avoid an unacceptable loss of the valuable ligand to the extractor loop and contamination of the pregnant strip liquid to the recovery system.

FIG. 2 is set up to represent station 3 with three stages. The more stripped organic is contacted with the more barren of the leach raffinate to provide the highest driving force available to prevent loss of ligand to loop 1. At the same time the most pregnant leach liquid is contacted with the most loaded organic to drive the final load onto the organic. This is a somewhat crude analysis of the stage contact but the forces at work are generally well understood by those skilled in the art.

Gas-liquid contact on the multiple trays of distillation towers is perhaps the more visible of stage-equilibrium conditions. In this liquid-liquid stage contact, the same principles of staging are present. The principle difference is that gas readily disengages from the liquid in each stage while in the present system the invention is provided to separate the liquids between each stage of liquid-liquid contact.

Stage contact of liquids is employed in the present practice of the prior art. However, the liquid streams are mixed with relative slowness to prevent them from forming a stable emulsion which is very difficult to break down. These requirements are usually met with large, slowly actuated mixing equipment and huge inventories of the liquid. The present invention collapses all of this equipment and liquid inventory into a relatively small package by pump-mixing, electrical coalescing and centrifugal agglomeration.

Both inlets to station 3, in FIG. 2, are designated by legends which correspond to those used in FIG. 1. However, to avoid any possibility of mistake, or confusion, the inlet for the stripped organic is designated 10 in in both drawings. The inlet for the pregnant leach liquid is 11, the outlet for the barren leach raffinate is 12 and the outlet for the loaded organic is 13. The liquid-mined copper of inlet 11 is mixed with the stripped organic of inlet 10 and the mined copper chemically transferred. The copper-loaded organic is discharged from outlet 13 and the barren leach raffinate is discharged from outlet 12 to be sent back to dissolve more copper. Of course, in FIG. 2 this transfer is disclosed as carried out in steps, or stages, to increase the efficiency of the transfer without requiring the tremendous volumes and time of the present art.

In multiple stages of FIG. 2, the stage to the left, on the drawing as viewed, is designated as the first stage. The units of the stage are pump 14, reaction tower 19, and separation tower 20. The stripped organic and pregnant leach liquid are mixed in pump 14. The mixture is provided a residence time in tower 19. The reaction, or chemical transfer, having taken place, the mixture is flowed into the separation tower 20 where the electric field and centrifuge quickly separate the two liquid streams.

Considering the first stage, pump 14 receives both the stripped organic through conduit 10 and pregnant leach liquid through conduit 17. Specifically, the pregnant leach liquid is from the separation tower of the second stage. Enough of the organic liquid is recycled from the separation tower of the first stage, through conduit 18, to insure the organic liquid remains the continuous phase.

In all events, the stripped organic and pregnant leach liquids are thoroughly and quickly mixed by the centrifugal pump 14. There is no faster, more efficient, practical means than a centrifugal pump for mixing these two streams. It is true the mixing action is so violent that a stable emulsion is formed with the aqueous pregnant leach liquid finely dispersed in the stripped organic liquid as the continuous phase. However, this emulsion can be easily broken by the electric field provided downstream of the pump-mixer. The dispersed aqueous phase is more polar than the organic phase and readily coalesces within an electric field.

Reaction tower 19 receives the mixture of liquids as an emulsion from pump 14. This vessel 29 is more than a volume to provide enough residence time for the pumped mixture to come to equilibrium in transfer of the mined metal from the pregnant leach liquid to the stripped organic liquid. With the chemical transfer at equilibrium, separation of the liquids must be made.

ELECTRIC FIELD COALESCING

Electric fields have been used to coalesce one liquid dispersed as drops in a second liquid when the dispersed liquid is more polar than the second. However, it is my contention that no one has conceived of using this force to coalesce dispersed barren leach raffinate from loaded organic, certainly not after the two liquids have been mixed by a pump.

In separator tower 20, an electrode 21 is formed at the wall of tower 20 and a second electrode 22 is extended down from the upper end 23 of tower 20. Specifically, inner electrode 22 is in the form of a cylinder at its upper portion and has the form of a cone at its lower portion. Whether a cylinder or a cone, the electrode 22 is spaced from the cylindrical electrode 21 to form an annulus 24 between them. It is down this annulus 24 that the emulsion from pump 14, and tower 19, flows. It is the electric field between the energized electrodes 21 and 22 that coalesces the dispersed aqueous phase of the raffinate into larger and larger drops.

The coalescing drops of the aqueous phase of the liquid mixture must be brought together carefully. As the drops become physically larger, they gravitate more quickly from the continuous phase in which they are distributed. However, the enlarging surface of the drops receive a larger force from the electric field. This force can become so large that it will move the enlarging drops rapidly enough in the continuous phase for liquid shear forces to be reached which will refragment the drops and limit their size. This cycle of coalescing growth and liquid shear decay will be sustained if the potential gradient between the electrodes is not adjusted to permit continual growth of the coalescing drops.

Enter the tapered form, or cone shape, of the lower portion of electrode 22. The cone shape of the electrode 22 provides divergence of the electrodes from each other in the direction of the flow of the emulsion in the annulus between them. As the electrodes diverge, their sustained potential gradient decreases. The electric field decreases in strength. This divergence and resulting potential gradient decrease of the field between the electrodes, is fixed to promote continued coalescence without reaching the value of liquid shear force which will refragment the coalesced drops.

CENTRIFUGAL AGGLOMERATION

Separation that the invention began with coalescence is completed with centrifugal agglomeration. A centrifuge is provided downstream of the electric field to produce the agglomeration. Specifically, a hydraulic cyclone form of centrifuge 25 is mounted vertically in separation tower 20 and below electrodes 21 and 22. The mixture of coalescing barren leach raffinate dispersed in loaded organic is flowed downward in annulus 24 and into tangential entry 26 of cyclone 25. The centrifugal force developed in cyclone 25 completes the separation of the liquids.

The tangential entry 26 of the liquid mixture spins the mixture on the internal walls of cyclone 25. Centrifugal force is developed on both liquids of the mixture. The heavier, more dense, aqueous barren leach raffinate is forced to the internal wall, leaving the lighter, less dense organic loaded with the copper at the center of the cyclone.

An additional force is available to move the aqueous barren leach raffinate to the internal wall of the cyclone. The more polar raffinate will accept a positive charge. This charge is picked up within the electric field of electrodes 21 and 22. A negative charge is placed upon the wall of cyclone 25 with a force additive to the centrifugal force generated by spinning the liquid mixture on the internal wall of the cyclone.

Conduit 27 is extended axially down from above tower 20, through the closure 23, through the conical electrode 22, through the top of cyclone 25 and to the center of the internal volume of the cyclone where the lighter loaded, organic remains as separated from the raffinate. Conduit 27 then forms the exit conduit for the loaded organic. The barren leach raffinate, spun to the internal wall of cyclone 25, exits through its bottom opening 28 to gravitate down into a body 29 in the bottom of tower 20. Conduit 12 connects through the lower wall of tower 20, and flow of the raffinate through the conduit is from the body 29 for return to the mining operation of dissolving copper from its ore.

Of course, the separation process does not proceed as neatly as so glibly described. Not all the loaded organic is flowed up conduit 27. Some goes out cyclone exit 28, with the raffinate. This loaded organic rises upward, around the outside of the cyclone 25. Organic liquid is recycled from its collection about the cyclone to the pump 14 with conduit 18. The flow of organic liquid into pump 14 is adjusted as a factor to keep the volumes of organic and leach liquid in the ratio which will insure the organic is maintained as the continuous phase of the mixture flowing into the electric field. With these conditions maintained, the more polar aqueous phase will be coalesced, agglomerated, and separated in an orderly fashion from the continuous organic phase.

THE REMAINING STAGES OF STATION 3

The three stages of FIG. 2 have merely been disclosed in illustration. The pump mixing, electric field coalescing and centrifuge agglomeration of each stage are interconnected alike. Further, the stages are connected to each other in series, the pregnant leach liquid flowing into the third stage pump through conduit 11 and the organic liquid stream flowing from the centrifuge of the third stage separation tower, loaded with the copper. The barren leach raffinate is withdrawn from the first stage separation tower through conduit 12 and the stripped organic liquid is conducted into the pump of the first stage through conduit 10.

After each exchange in the stages, the separation by electric field coalescing and hydraulic cyclone agglomeration is rapid and efficient. The valuable ligand in the organic loop 4 is not leaked into extractor loop 1 and lost in the mining contact with the earth.

STATION 5

Station 5 is a duplication of station 3 and has the same problems. The invention solves these problems in the way it solved the problems of station 3. Loaded organic liquid is mixed with barren strip liquid to chemically transfer the copper from the ligand to the strip liquid. The strip liquid, pregnant with the copper, is then conducted to recovery station 7.

The copper is specifically plated on electrodes immersed in the pregnant strip liquid. After a predetermined thickness of the copper has been deposited upon its electrode, the electrode is washed and sent directly to fabrication. Other recoverable materials require other forms of recovery systems. However, the invention will function in all forms of solvent extraction systems. The embodiment of the present invention is literally the door between liquid loops. It is the switch point for the recoverable material passed through the loops for concentration and ultimate recovery in useable form.

CONCLUSION

Structuring definitions of the facets of the invention concepts in the disclosure is difficult to couch in robust language within this particular art. The concepts are novel but they are embodied in process and structure which can only be described in plebian terms such as pump-mixer, electric field and centrifuge. True, exotic terms have been developed for the liquid flowing through the process and apparatus. There is the barren leach raffinate, the pregnant leach feed liquid, a ligand in an organic carrier, barren strip solution and pregnant strip solution. However, the terms of the process and structure which mix and separate these liquids are hardly a dramatic arsenal from which to select telling combinations which ring with the solid worth of the advances made by this invention. Therefore, if words with a persuasive bite to them are in short supply, at least simplistic terms have been marshalled to make it clear to even the most casual reader how this disclosed embodiment of the invention functions to achieve its objectives.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described what is claimed is:

1. A cyclic process for selectively recovering metals from a material containing other metallic values in addition to the selected metal, comprising,
    (A) leaching said material with an aqueous leach solution;
    (B) Recovering a pregnant, aqueous leach solution containing the selected metal and other metallic contaminants dissolved therein;
    (C) intimately mixing the recovered aqueous leach solution with an organic medium containing a ligand which is capable of selectively extracting the selected metal from the aqueous solution, thereby producing a dispersion comprising an aqueous portion containing said other metallic and exchanged ions, and an organic portion containing the ligand and the selected metal values;
    (D) passing the dispersion from step (C) through a flow path across which charged electrodes establish an electrostatic field which coalesces the drops of aqueous leach solution dispersed in the organic medium;

(E) centrifuging the electrically treated dispersion to agglomerate the coalesced drops of aqueous solution and separate them from the organic medium;

(F) recycling the agglomerated aqueous phase as leach solution for further leaching of said material;

(G) intimately mixing the organic phase from step (E) with an aqueous stripping solution which is capable of stripping the selected metal ions from the ligand of the organic phase, thereby producing a second dispersion comprising an aqueous portion containing the selected metal and an organic portion containing the ligand;

(H) passing the dispersion from (G) through a second flow path across which electrodes establish an electrostatic field which coalesces the drops of aqueous leach solution dispersed in the organic medium;

(I) centrifuging the electrically treated dispersion to agglomerate the coalesced drops of aqueous stripping solution and separate them from the organic medium;

(J) recycling the organic phase from step (I) as the organic medium containing a ligand to be mixed with further leach solution in step (C); and (K) recovering the selected metal values from the aqueous stripping phase obtained in step (I).

2. A process in accordance with claim 1, wherein the selected metal is copper, the leach solution which is mixed with the organic medium containing a ligand has an acidic pH, the organic medium containing a ligand is selected from the group consisting of hydroxyquinoline, alpha-hydroxyoximes, and ethyl-enediaminetetraacetic acid, and the stripping solution is an aqueous acid solution.

3. A process in accordance with claim 2, wherein the copper values are recovered from the aqueous phase obtained in step (H) by passing an electrical current through said aqueous solution to deposit the copper values as high quality cathode copper and produce an acidic aqueous solution which is recycled for use as acid stripping solution in step (G).

4. A process in accordance with claim 1, wherein the selected metal is copper, the leach solution which is mixed with the organic medium containing a ligand has a basic pH, the organic medium containing a ligand selected from the group consisting of hydroxyquinoline and alpha-hydroxyoximes, and the stripping solution is an aqueous acid solution.

* * * * *